(12) United States Patent
Bünten et al.

(10) Patent No.: US 7,669,447 B2
(45) Date of Patent: Mar. 2, 2010

(54) COMBINED USE OF OIL AND EMULSION FOR THE COLD-ROLLING OF STRIPS

(75) Inventors: Rolf Bünten, Aachen (DE); Rainer Effertz, Düsseldorf (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 350 days.

(21) Appl. No.: 10/488,454

(22) PCT Filed: Aug. 28, 2002

(86) PCT No.: PCT/EP02/09570

§ 371 (c)(1),
(2), (4) Date: Mar. 3, 2004

(87) PCT Pub. No.: WO03/022474

PCT Pub. Date: Mar. 20, 2003

(65) Prior Publication Data

US 2005/0011243 A1  Jan. 20, 2005

(30) Foreign Application Priority Data

Sep. 5, 2001 (DE) .............................. 101 43 407

(51) Int. Cl.
*B21B 45/02* (2006.01)
*B21B 27/10* (2006.01)
(52) U.S. Cl. ............................. 72/41; 72/201
(58) Field of Classification Search ............... 72/41–45, 72/201, 234
See application file for complete search history.

(56) References Cited

U.S. PATENT DOCUMENTS 3,277,686 A * 10/1966 James et al. ................. 72/201
4,344,308 A * 8/1982 Shimada et al. ............... 72/39
4,475,369 A * 10/1984 Matsuda et al. ............... 72/38

(Continued)

FOREIGN PATENT DOCUMENTS

GB     2297709     *  8/1996

(Continued)

OTHER PUBLICATIONS

Patent Abstracts of Japan, vol. 2000, No. 07, Sep. 29, 2000 & JP 2000 094026 A (NKK Corp), Apr. 4, 2000.

*Primary Examiner*—Dana Ross
*Assistant Examiner*—Debra M Sullivan
(74) *Attorney, Agent, or Firm*—Friedrich Kueffner

(57) ABSTRACT

The invention relates to a method for cold-rolling strips consisting of, inter alia, special steels and/or nonferrous metals, in a multi-stand tandem rolling mill. The first stand(s) carry out comparatively high reductions and the last stand(s) determine the surface quality of the strip, with a relatively low reduction. The aim of the invention is to improve the capacity of the tandem rolling mill in terms of thickness reduction and in terms of the surface quality of the rolled strips. To this end, an emulsion is used as a coolant and lubricant for the first passages of the strip through the tandem rolling mill with relatively high reduction. The adhesive coolant and lubricant film is then squeezed off the strip following removal from the roll gap of the last emulsion-operated stand. Rolling oil is used as a lubricant for especially the last passage(s) through the tandem rolling mill with relatively low reduction. The invention also relates to an installation for carrying out the inventive method.

5 Claims, 1 Drawing Sheet

U.S. PATENT DOCUMENTS

| | | | |
|---|---|---|---|
| 5,636,544 A * | 6/1997 | Tomizawa et al. | 72/366.2 |
| 5,701,775 A * | 12/1997 | Sivilotti et al. | 72/201 |
| 6,189,358 B1 * | 2/2001 | Fanchini et al. | 72/229 |
| 6,497,127 B2 * | 12/2002 | Nishiura et al. | 72/44 |

FOREIGN PATENT DOCUMENTS

| | | | | |
|---|---|---|---|---|
| JP | 04052005 A | * | 2/1992 | 72/41 |
| JP | 8-33905 | * | 2/1996 | |
| JP | 08033905 A | * | 2/1996 | |

* cited by examiner

COMBINED USE OF OIL AND EMULSION FOR THE COLD-ROLLING OF STRIPS

BACKGROUND OF THE INVENTION

The invention concerns a process for cold rolling strip composed, for example, of special steels and/or nonferrous metals in a multi-stand tandem rolling mill, in which the first stand(s) carry out relatively large reductions, and the last stand(s) determine the surface quality of the strip with relatively low reduction. The invention also concerns an installation for carrying out the process.

Strip cold-rolling processes have two basic objectives: first, with respect to the rolling stock, to achieve the greatest possible draft per pass with comparatively low demands with respect to the surface quality of the product and, second, with respect to the finished product, to achieve an optimum specific surface quality with comparatively low reduction. To achieve this twofold objective, previous rolling technology has always provided for the use of only one lubricant/coolant (emulsion or oil), and compromises had to be accepted in various rolling programs.

Rolling oil used as a cold-rolling lubricant has lubricating properties that are better than those of an emulsion by a factor of 1.3. Together with selected additives, this oil always produces a homogeneous film on the surface of the strip, which has the advantage of efficient separation of strip surface and deforming roll. Therefore, the resulting strip surface is extremely homogeneous and has a fine structure. A high surface brightness can be produced. Although rolling oil is relatively expensive, it is easy to handle, so that a more or less unlimited service life is achieved with low maintenance costs. However, rolling oil has the critical disadvantage that it is a very poor heat conduction medium and also has a low heat capacity. This results in elevated temperatures of the strip and roll during the rolling process, so that in unfavorable cases the work rolls reach maximum allowable temperatures, and the strip itself has temper colors. Due to the lower cooling effect, flatness control by zone cooling proceeds less effectively than with the use of media with a higher cooling effect.

Although the disadvantage of the poor cooling effect of rolling oil can be at least partially eliminated by the use of an emulsion as the rolling aid, the lubricating effect of an emulsion is determined mainly by the droplet size and by the saponification number. However, the lubrication is significantly less homogeneous, which is the reason that the emulsion oil that is used must contain special substances, if lubrication that is satisfactory to some degree is to be obtained. These two characteristics and difficulties result in a surface quality that is not as good. In addition, the filterability of an emulsion is limited due to the size of the oil droplets. A fine or extremely fine filtration cannot be performed, because it would cause phase separation, which would have negative consequences for the surface of the strip.

Weighing the specific characteristics of the different lubricants and coolants leads to the conclusion that, to produce high-grade cold-rolled strip made of special steel in tandem rolling mills, new methods must be sought to guarantee strip surfaces of the highest quality.

The document WO 98/51,423 describes a tandem rolling mill with two stands for the production of thin steel strip in gages as small as 0.18 mm. These stands achieve a reduction of usually 50-60%. To achieve further reduction, a final cold-rolling pass is carried out. However, this does not make it possible to go below a certain thickness limit, because that would lead to inferior and unsatisfactory product quality.

The rolling mill described in WO 98/51,423 has a first lubrication system and a second lubrication system, which can be alternately connected, depending on the given operating state. Different circulations using separate tanks are provided to prevent mixing of the lubricant fluids. Each tank is equipped with its own means for controlling and filling the liquid level and its own means for monitoring the composition of the lubricant. In accordance with one variant, the monitoring devices for the composition of the lubricant are accompanied by means for at least partially restoring the physical/chemical characteristics of the lubricants. Proportioning devices for substances such as lubricating oil, additives, inoculating agents, etc., are provided, which are suitable for restoring or reestablishing the lubricant characteristics. Stirring devices are used to maintain a uniform concentration of the lubricating fluid at all times to prevent deposits and contamination. The reference to "concentration of oil in the lubrication mixture" shows that, in this method, they were thinking of the use of emulsions with different concentrations. The alternative use of homogeneous monodisperse rolling oils is not the object of the document cited above.

The document 770 573 of the Union of Soviet Socialist Republics (USSR) describes a process for rolling and temper rolling on a two-stand rolling mill, which involves the shaping of the metal with a reduction in the first stand of 40-60% and in the second stand down to as little as 5% with lubrication and roll cooling. To increase the efficiency of the process,. to reduce the power consumption for the shaping and to obtain high-quality rolled strip with a flawless surface finish, the lubrication and cooling are carried out only in the first stand. An emulsion of high-viscosity mineral oils with a concentration of up to 1% is used as the lubricant, and an aqueous surfactant solution with a concentration of up to 0.001 moles/L is used as the coolant, and a wash solution is applied to the strip before and after the second stand.

SUMMARY OF THE INVENTION

Proceeding from the prior art cited above, the objective of the invention is to specify a process and a corresponding installation for carrying out this process, by which a significant increase in the efficiency of the rolling process, simultaneous improvement of the cooling of the strip and roll, and optimization of the surface quality of the final product, i.e., the rolled strip, can be achieved in the cold rolling of strip made of special steel and/or nonferrous metals.

In accordance with the invention, this objective is achieved by a process in which an emulsion is used as the coolant and lubricant for the first passes of the strip through the tandem rolling mill with relatively high reduction, the adhering coolant and lubricant film is squeezed off the strip after it emerges from the roll gap of the rolling stand, and rolling oil is used as the lubricant, especially for the last pass or passes of the strip through the tandem rolling mill with relatively low reduction. The cooling effect in the first reduction stages of the rolling mill is increased by the use of emulsions. The surface appearance of the rolled strip is significantly improved by the use of rolling oil in the last reduction stage of the rolling mill. All together, a significant increase in the efficiency of a rolling mill is achieved.

A refinement of the process of the invention provides that first emulsions are used in the last stand(s) for the first passes of the strip through the tandem rolling mill, and rolling oil is used as the lubricant, especially for the last pass or passes.

Another refinement of the invention provides that different coolants and lubricants, such as heterogeneous mixtures in the form of emulsions and a monodisperse medium in the form of rolling oil, are alternately used according to the performance of the rolling process.

In accordance with the invention, this requires the use of two separate parts of the installation for the use of emulsions and rolling oil, respectively, which consist of two complete, independent systems that avoid to the greatest possible extent any mixing of the different coolants and lubricants.

An installation for cold rolling strip that is composed, for example, of special steel and/or nonferrous metals, which comprises a multi-stand tandem rolling mill, consists essentially of two independent coolant and lubricant systems, an emulsion system with tanks, system pumps, coolers, and vacuum band filters and/or pressure band filters, and a rolling oil system, which contains the system components specified above, such that the filters are extremely fine, reversible-flow filters, so that the very highest filtrate purity can be achieved to ensure that the extremely high requirements on the surface quality of the rolled strip can be met.

A refinement of the installation in accordance with the invention provides for a purification circulation with means for switching between the emulsion and the rolling oil system. Since the last stand(s) of the tandem rolling mill can be operated both with emulsion and with rolling oil, it is further proposed, in accordance with the invention, that separate spray bars for emulsion and rolling oil be assigned to the last stand(s) of the tandem rolling mill.

The following explanation of the embodiment shown schematically in the drawing shows further details, features and advantages of the invention.

DETAILED DESCRIPTION OF THE INVENTION

Figure 1:
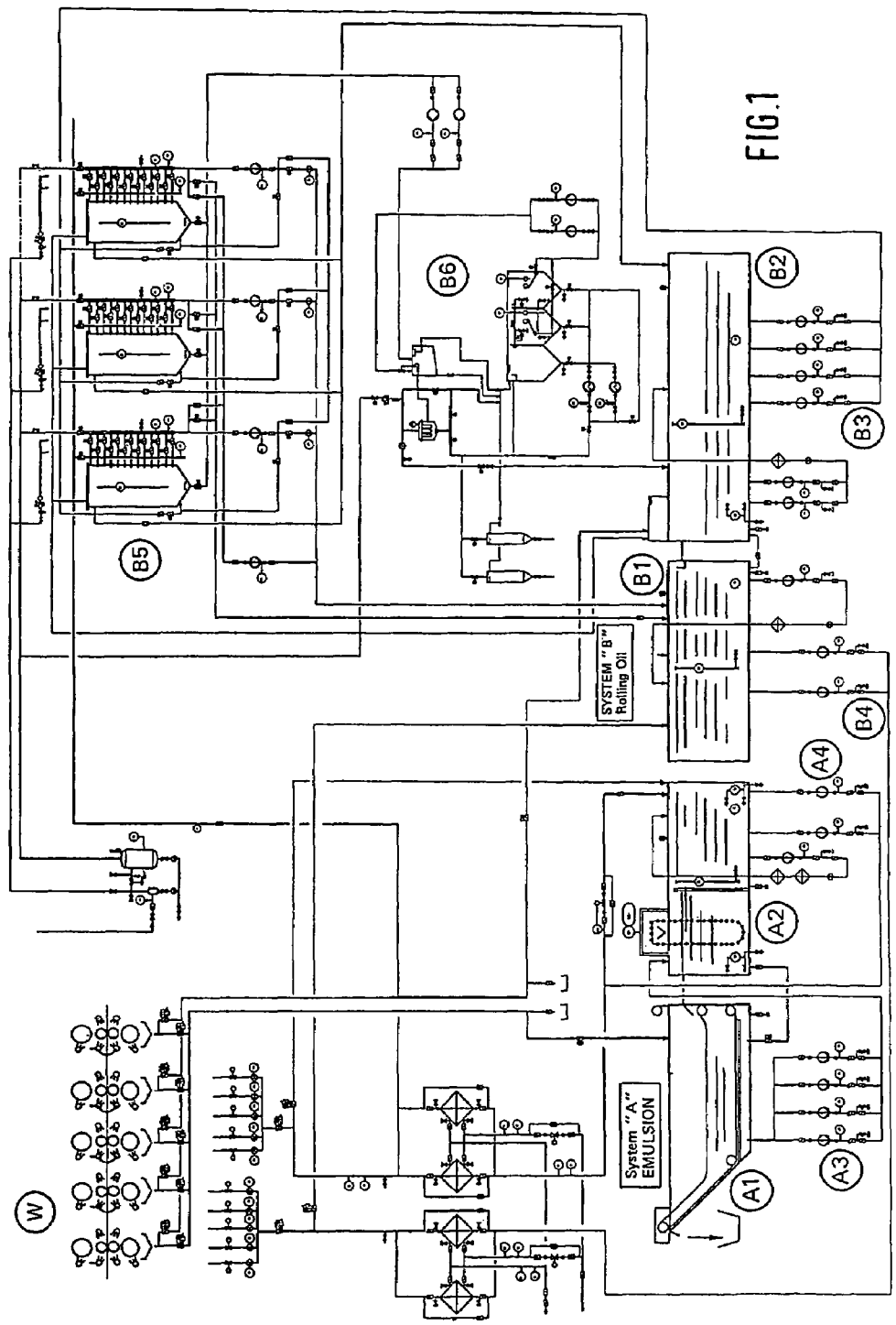
FIG. 1 is a schematic representation of one embodiment of the present invention.

FIG. 1 shows a process diagram of an installation for the combined application of emulsion and oil in a 5-stand tandem cold-rolling mill with rolling train W. The coolant and lubricant system designated "System A", comprises the rolling emulsion system with a vacuum filter A1, a pure rolling emulsion tank with magnetic separator A2, vacuum filter pumps A3, and system pumps A4. The rolling emulsion system, "System A", is assigned to all five rolling stands of the rolling train.

The rolling oil system is designated "System B" and comprises the pure oil tank B1, the dirty oil tank B2, the filter pumps B3, the system pumps B4, the extremely fine filter system B5, and the secondary filter system B6. The rolling oil system is assigned only to the last stand or the last stands of the tandem rolling train. Two movable collecting tanks, which are not shown in the drawing, may be assigned to these last stands, one for emulsion and the other for rolling oil, depending on whether the last rolling stands are operated with emulsion or with rolling oil.

The invention makes it possible, in the operation of tandem rolling trains, which are being used to a greater and greater extent even for the production of special steel, to use an emulsion in the operation of the first stands, which generally carry out large reductions and thus produce large amounts of heat in the strip. The emulsion is squeezed off the strip after the emulsion-operated stands to maximum amounts of residual oil of, for example, 220 mg/m$^2$. The rolled strip then enters the last rolling stand or stands of the rolling train. These stands are operated with rolling oil and carry out smaller reductions. In this way the surface is refined and given a metallic luster and thus satisfies today's high standards for the surfaces of cold-rolled strip.

The method of the invention can be successfully used in multi-stand tandem rolling mills equipped with, for example 5-7 stands, in two-stand reversing tandem rolling mills, or in single-stand one-way and reversing rolling mills.

The invention claimed is:

1. Process for cold rolling strip composed of at least one of stainless steel and nonferrous metal in a multi-stand tandem rolling mill, in which first stand(s) carry out large reductions, and last stand(s) determine surface quality of the strip with low reduction, wherein an emulsion is used as a coolant and lubricant for the first stands for first passes of the strip through the tandem rolling mill with high reduction, adhering coolant and lubricant film is squeezed off the strip after it emerges from a roll gap, and only rolling oil is used as a lubricant for a last pass or passes of the strip through the tandem rolling mill with low reduction, wherein the rolling mill includes two independent coolant and lubricant systems that use emulsions and rolling oil, respectively, wherein the emulsion is squeezed off the strip after emulsion-operated rolling stands of the tandem rolling mill to maximum amounts of residual oil of 150-300 mg/in$^2$, wherein the two independent systems are configured to substantially prevent any mixing of the different coolants and lubricants.

2. Process in accordance with claim 1, wherein emulsions are used as coolants in last stand(s) for the first passes of the strip through the tandem rolling mill.

3. Process in accordance with claim 1, wherein different coolants and lubricants are used based on performance of the rolling process.

4. Process in accordance with claim 3, wherein the different coolants and lubricants are heterogeneous mixtures formed as emulsions and a monodisperse medium formed as rolling oil.

5. Process in accordance with claim 1, wherein the emulsion and rolling oil systems can be exchangeably connected.

* * * * *